United States Patent [19]
Floyd

[11] Patent Number: 4,904,450
[45] Date of Patent: Feb. 27, 1990

[54] HIGH TEMPERATURE AND HIGH PRESSURE DIGESTION VESSEL ASSEMBLY

[76] Inventor: Terry Floyd, 4527 Island Fork Rd., Lake Wylie, S.C. 29710

[21] Appl. No.: 317,461

[22] Filed: Mar. 1, 1989

[51] Int. Cl.[4] ............... G05D 16/08; G01N 31/12; F16J 13/12
[52] U.S. Cl. .................................. 422/113; 422/78; 422/99; 422/102; 422/104; 219/10.55 E; 219/10.55 R; 215/250; 215/260
[58] Field of Search ............... 422/78, 113; 220/89 A, 220/207, 209; 215/250, 260; 219/10.55 E, 10.55 R

[56] References Cited

U.S. PATENT DOCUMENTS

| | | | |
|---|---|---|---|
| 4,613,738 | 9/1986 | Saville | 219/10.55 E |
| 4,655,070 | 4/1987 | Clift | 220/89 A |
| 4,736,083 | 4/1988 | Saville | 219/10.55 E |

Primary Examiner—Barry S. Richman
Assistant Examiner—Jeffrey R. Snay
Attorney, Agent, or Firm—W. Thad Adams, III

[57] ABSTRACT

A high temperature, high pressure chemical digestion vessel comprising an inner container within which digestion is to take place under high temperature and high pressure conditions. The container is provided with a vent. A replaceable, rupturable pressure release disk is provided having a predetermined rupture pressure for being sealingly interposed in covering relation to the vent to seal the container and thereby enclose a substance to be digested in the container and to rupture and release pressure within the container if pressure within the container reaches the predetermined rupture pressure. The pressure release disk comprises a flat sheet material. A container cap is provided for holding the pressure release disk in sealing relation to the vent in the container. An outer pressure resisting-casement is provided for receiving the container therein and providing support to the container.

10 Claims, 3 Drawing Sheets

HIGH TEMPERATURE AND HIGH PRESSURE DIGESTION VESSEL ASSEMBLY

TECHNICAL FIELD AND BACKGROUND OF THE INVENTION

This invention relates to a high pressure and high temperature digestion vessel assembly. The assembly is particularly adapted for use in a microwave oven and permits safe and effective chemical digestion for the purpose of chemical analysis. Microwave heating and digestion of organic samples in an enclosed high pressure and high temperature vessel has greatly shortened the amount of time required to perform these tests. The assembly solves several problems which have been observed in prior devices used for the same purpose. For example, U.S. Pat. No. 4,672,996 discloses a pressure vessel which includes a self-regulating valve positioned under a lid which is threaded onto the vessel. The valve includes a pressure-deformable, resilient wall member having a fluid vent port and an obstructing member which cooperates with the wall member to open the valve. While this device offers several advantages over prior devices, it nevertheless contains features which offer several problems.

The relief point of the valve is a function of the ability of the lid to deform and the torque with which the lid is tightened onto the vessel. Even with careful control of the torque, the deformation of the valve occurs at a temperature which cannot be accurately predicted. For this reason, both time and temperature remain variables since there is no direct temperature sensing within the vessel. Pressure resistance and distortion at various points on the vessel also vary.

The valve of the '996 Patent requires an expensive torque station to precisely tighten the lid on the vessel. The requirement of a torque station introduces a further variable, since it must be frequently calibrated and is subject to improper operation. Because of the design of the valve, vapors containing trace elements collect between the valve disk and the lid and condense when cooled. This liquid must be rinsed out with a known quantity of water and added back to the sample before the results of the digestion can be calculated. Even liquid trapped in the threads of the vessel can cause a variation in the results of the digestion.

The life of the device in the '996 Patent is limited to 30-50 tests, depending upon the pressure range of the test, since pressure tends to deform the vessel during each test. The pressure relief tube projects vertically out of the top of the vessel, meaning that the tube must be turned 180 degrees to carry any escaping vapor or liquid into a collection vessel. If the relief tube blows out of the valve, vapors may spray upwardly into the face of the operator.

Another prior art device is the Parr microwave acid digestion bomb. On occasion, the term "bomb" is quite apt. The hazards involved in using this product are recognized in literature distributed by the manufacturer, and include the possibility of uncontrolled explosion or discharge of contents under high temperature and pressure. Heating of the contents is solely by empirical determination of the proper combination of time and microwave power. In addition, a relatively expensive 0-ring must be replaced quite frequently.

The known prior art devices do not offer a combination of a safe digestion vessel with precise and repeatable temperature and pressure control.

SUMMARY OF THE INVENTION

Therefore, it is an object of the invention to provide a safe microwave digestion vessel assembly.

It is another object of the invention to provide a microwave digestion vessel assembly which permits precise control of temperature and pressure.

It is another object of the invention to provide a microwave digestion vessel assembly which permits quick and inexpensive change of the pressure relief point of the vessel assembly.

It is another object of the invention to provide a microwave digestion vessel assembly which provides accurate and reproducible test results.

It is another object of the invention to provide a microwave digestion vessel assembly which substantially eliminates pressure and temperature fatigue which shortens the life of the assembly and increases the possibility of vessel failure.

These and other objects of the present invention are achieved in the preferred embodiments disclosed below by providing a high temperature, high pressure chemical digestion vessel comprising an inner container within which digestion is to take place under high temperature and high pressure conditions. The container is provided with a vent. A replaceable, rupturable pressure release disk is provided having a predetermined rupture pressure for being sealingly interposed in covering relation to the vent to seal the container and thereby enclose a substance to be digested in the container and to rupture and release pressure within the container if pressure within the container reaches the predetermined rupture pressure. The pressure release disk comprises a flat sheet material.

A container cap is provided for holding the pressure release disk in sealing relation to the vent in the container. An outer pressure resisting-casement is provided for receiving the container therein and providing support to the container.

According to one preferred embodiment of the invention, the cap comprises a lower cap part for being received on a mouth of the container and having a recess therein for receiving the pressure release disk therein in overlying relation to the vent, and an upper cap part for being received on the lower cap part and having means for imparting sealing pressure to the pressure release disk surrounding the vent. The lower cap part includes a seat whereby the lower cap part will matingly fit without mechanical attachment on the mouth of the container. The outer casement includes a casement cap for cooperating with the lower cap part for imparting sealing pressure to the lower cap part and the container.

Preferably, the upper cap part includes a seat whereby the upper cap part will matingly fit without mechanical attachment on the lower cap part remote from the container.

The container and the outer casement are each transparent to microwave radiation.

According to one preferred embodiment of the invention, the outer casement is formed of polyetherimide resin and the inner container is formed of perfluoroalkoxy resin ("PFA") Teflon.

Preferably, the outer casement includes a through opening in a bottom surface to assist in removal of the container from the outer casement and the upper cap part includes an upwardly-projecting pressure-relief head of reduced dimension having a pressure-relief opening therein. The outer casement cap includes an opening therein for receiving the pressure-relief head therethrough.

According to another preferred embodiment of the invention, the microwave vessel assembly comprises a microwave transparent inner container having a round bottom and integrally-formed cylindrical sidewalls the upper edge of which defines a cylindrical mouth for receiving material to be chemically digested under high pressure and high temperature.

A lower cap part is provided having a pressure vent therethrough and an annular seat formed on a bottom side thereof for being matingly seated without mechanical attachment on the cylindrical mouth of the container. The lower cap part has an annular recess in a top side thereof for receiving a replaceable, rupturable pressure release disk having a predetermined rupture pressure for being sealingly interposed in the recess in covering relation to the vent. The disk seals the container and thereby encloses a substance to be digested in the container. The disk ruptures and releases pressure within the container if pressure within the container reaches the predetermined rupture pressure. The pressure release disk comprises a flat sheet material.

An upper cap part having a pressure vent therethrough and a bottom side is provided with an annular seat for being matingly fitting onto the top side of the lower cap part without mechanical attachment. The upper cap part cooperates with the recess of the lower cap part for containing the pressure release disk therein.

A microwave transparent outer casement is provided and comprises a round bottom and integrally-formed cylindrical sidewalls, the upper edge of which defines a cylindrical mouth. The sidewalls are of a diameter to receive the container therein in sliding surface-to-surface contact. The outer casement includes a casement cap for being attached to the upper edge of the cylindrical sidewalls and tightened to the upper and lower cap parts and the pressure disk therebetween compress in pressure-resisting relation on the mouth of the container.

According to another preferred embodiment of the invention, the outer casement includes a through opening in a bottom surface to assist in removal of the container from the outer casement.

According to yet another preferred embodiment of the invention, the upper cap part includes an upwardly-projecting pressure-relief head of reduced dimension having a pressure-relief opening therein. The outer casement cap includes an opening therein for receiving the pressure-relief head therethrough.

Preferably, the casement cap and the upper cylindrical walls of the casement include mating threads.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
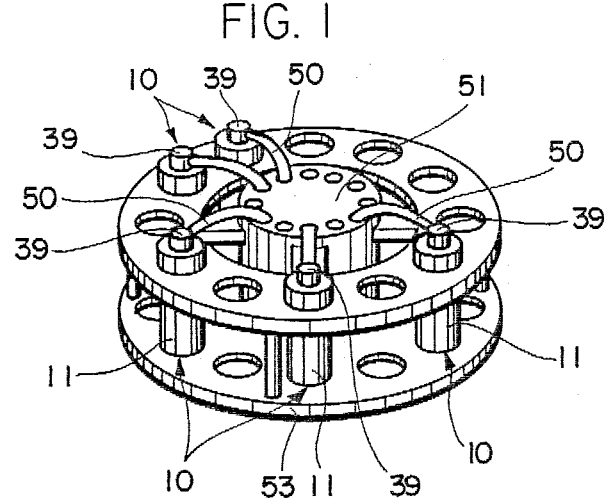
FIG. 1 is a perspective view of a vessel assembly rack into which a number of vessel assemblies are placed for processing samples in a microwave oven.
Figure 3:
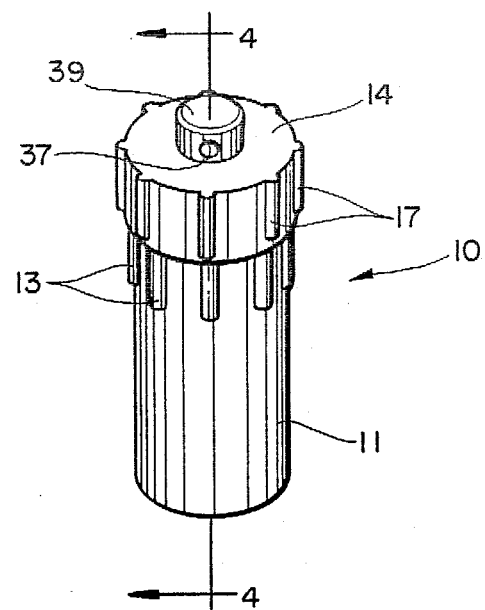
FIG. 3 is a perspective view of an assembled vessel assembly according to one embodiment of the present invention.
Figure 2:
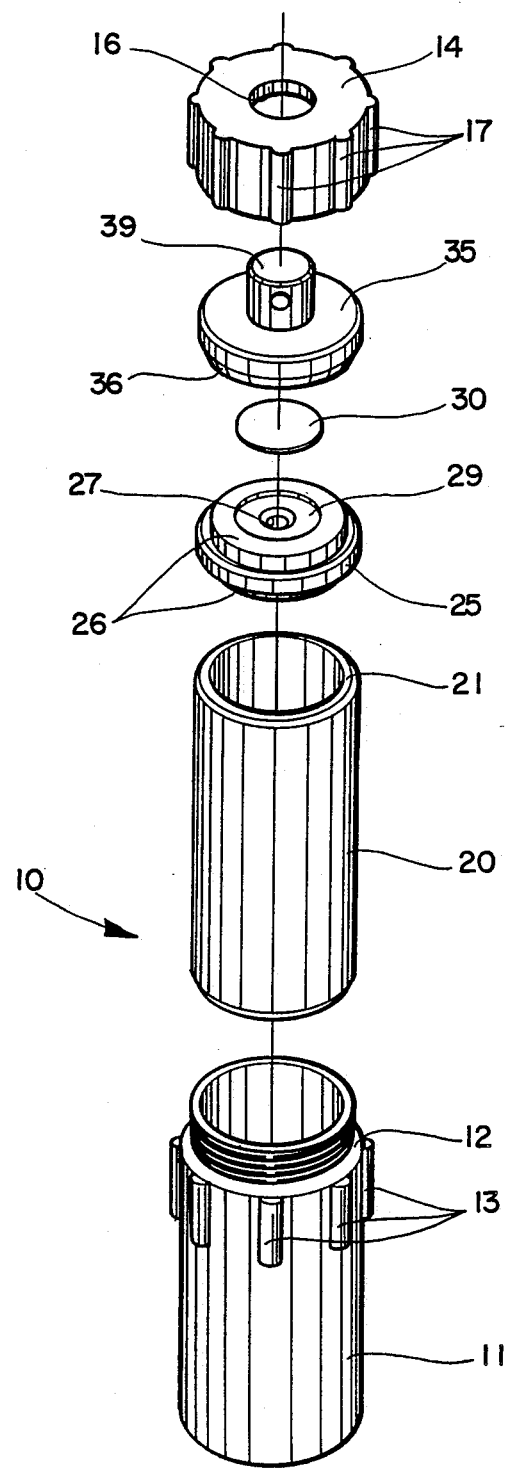
FIG. 2 is an exploded perspective view of a vessel assembly according to the present invention.

Referring now specifically to the drawings, a microwave digestion vessel assembly according to the present invention is illustrated in FIGS. 1-4 and shown generally at reference numeral 10. Referring now to FIG. 2, vessel assembly 10 includes a cylindrical outer casement 11 molded of polyetherimide resins. This material is microwave transparent. Threads 12 are molded into the top edge of casement 11 as are gripping lugs 13. Casement 11 includes an access opening 18 in the bottom wall into which can be inserted a finger or other object to push out the contents of casement 11. A cylindrical casement cap 14, also molded of polyetherimide resins, is provided with internal threads 15 (see FIG. 4) which mate with threads 12 of outer casement 11 so that cap 14 may be threaded onto casement 11 to a desired tightness. Cap 14 includes a centrally-formed opening 16 and molded gripping lugs 17.

Vessel assembly 10 also includes a cylindrical inner container 20 molded of PFA Teflon, a chemically-inert material which is also resistant to degradation under high temperature and pressure. Container 20 is sized to fit in a close surface contact into outer casement 11, but not so close that sliding contact is prevented. Outer casement 11 provides support to the side walls of container 20 when under pressure.

The upper, annular edge 21 of container 20 is formed with a convex profile. An annular lower cap part 25 molded of PFA Teflon has an annular concave seat 26 formed on the bottom side thereof which mates with edge 21. There is no mechanical interconnection between lower cap part 20 and container 20, such as by threads or a bayonet mount. Rather, lower cap part 20 merely sits on edge 21. In the preferred embodiment described here and shown in the drawing, the structure of lower cap part 25 is symmetrical top to bottom, so that either side of lower cap part 25 may be the top or bottom. This avoids the possibility that incorrect top-to-bottom installation of lower cap part 25 would cause a safety or operational problem.

Lower cap part 25 has a concentric through pressure vent 27 surrounded on both sides of lower cap part 25 by an annular recess 29. Recess 29 is shaped and sized to receive a circular replaceable, rupturable pressure disk 30. As is shown by continued reference to FIG. 2, disk 30 is formed of a flat sheet material, preferably of PFA Teflon which fits loosely into recess 29. The pressure relief point of the vessel assembly 10 is therefore easily varied by using a disk having suitable, predetermined rupture point. For example, a disk 30 fabricated of PFA Teflon will rupture at the following pressures for a given thickness:

| Thickness (in.-cm) | Relief Pressure (psi-kg./sq.m.) |
|---|---|
| .002/.005 | 90/63,270 |
| .003/.008 | 125/87,875 |
| .005/.013 | 160/112,489 |
| .007/.018 | 210/147,630 |

The disks 30 themselves are extremely inexpensive and avoid the necessity of torquing or otherwise adjusting the other parts of the vessel assembly 10. Disk 10 has no frame or other holding or support structure. The disk 10 is placed loosely in recess 29 and is sized to substantially overlay and extend radially-outwardly beyond the pressure vent 27 but at least slightly smaller in circumference than recess 29.

Disk 30 is held in sealing relation in recess 29 by upper cap part 35, also molded of PFA Teflon. As is best shown by reference to FIG. 4, the underside of upper cap part 35 includes an integrally-formed, raised annular ridge 36 which presses against disk 30 around pressure vent 27 and seals against fluid and pressure flow through pressure vent 27. As with lower cap part 25 on container 20, upper cap part has an annular seat 36 which cooperates with the adjacent surface of lower cap part 25. No mechanical attachment is provided between lower cap part 25 and upper cap part 35.

Figure 4:
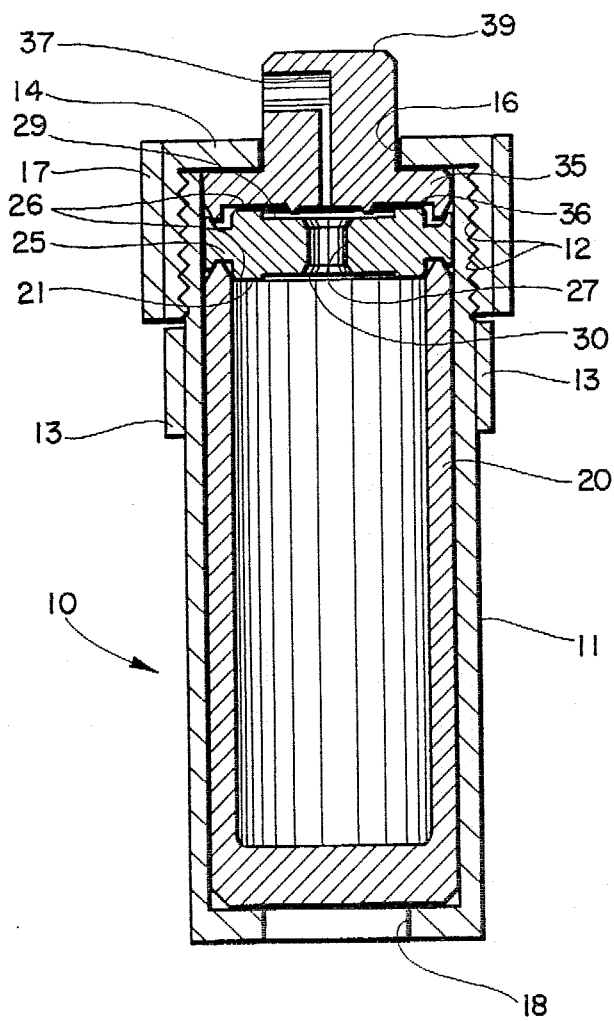
FIG. 4 is a vertical cross-section taken along line 4—4 of the vessel assembly shown in FIG. 3.

Upper cap part 35 is provided with a pressure relief vent 37 coaxial with pressure vent 27 in lower cap part 25. Upper cap part 35 includes a raised pressure relief head 39 of reduced diameter sized to fit through and project upwardly through opening 16 in casement 14. As is also shown in FIG. 4, pressure relief vent 37 makes a right angle turn and exits head 39 on its vertical side surface. Any vapor or liquid exiting vent 37 will travel horizontally and is therefore less likely to be directed into the face of the operator.

As is shown in FIG. 1, a tube 50 is fitted into pressure relief vent 37 and into a collection receptacle 51 so that any material discharged from a vessel assembly 10 upon rupture of disk 30 is contained.

FIG. 4 illustrated a preferred profile shape for the mating edges of container 20, lower cap part 25 and upper cap part 35. The vessel assembly 10 is assembled by placing container 20 into outer casement 11. Lower cap part 25 is placed onto the top of container 20, and a disk 30 of suitable thickness into recess 29. Upper cap part 35 is placed onto lower cap part 25 and casement cap 14 is placed over upper cap part 35 and tightened down by threads onto outer casement 11. Tightening casement cap 14 drives annular ridge 36 into disk 30, sealing it against the upper side of lower cap part 25, and also seals the edges of the component parts of vessel assembly 10 against each other by controlled deformation of the profile shapes of the mating edges. One or more vessel assemblies 10 are then placed in a rack 53 which includes the collection receptacle 51. Rack 53 is placed in a microwave oven (not shown). Time and power settings for the microwave oven are determined empirically.

Primary structural integrity of the vessel assembly 10 is provided by the high strength outer casement and casement cap 11 and 14. Use of the outer casement 11 virtually eliminates stress and distortion of the inner container, provides excellent strength and reproducible results for temperatures up to 250° C. Outer casement 11 also acts as an insulator and therefore promotes uniform heating. The outer surface temperature of casement 11 and cap 14 seldom exceeds 50 degrees C.

The design of casement 11 and container 20 prevents cap 14 from being turned and loosened without excessive force until the vessel assembly has been properly cooled. Use of pressure disks 30 with variable relief points ca assist in establishing test procedures, particularly where samples such as petroleum products and organic materials may require venting. Furthermore, inspection of the relief disk is positive evidence of loss of sample during the test run. After the test run is over and the vessel assembly 10 has properly cooled, the assembly is disassembled by removing cap 14 and pushing container 20 out of casement 11 with the pressure relief head 39 of upper cap part 35 or other object through access opening 18.

As noted immediately above, pressure relief head 39 is sized to fit through access opening 18 in the bottom of casement 11. This feature not only permits removal of container 20 after the test run is over, but greatly facilitates the addition of reagents or other substances to container 20 when desired. After proper cooling, casement cap 14 can be loosened and removed from casement 11, permitting upper cap part 35 to be removed. Upper cap part 35 is placed on a flat surface and the remaining assembly of inner container 20 within outer casement 11 is positioned over upper cap part 35 and lowered onto it. As the pressure relief head 39 extends upwardly into outer casement 11 through access opening 18, it pushes inner container 20 upwardly. The distance that inner container 20 is pushed upwardly is sufficient to position lower cap part 25 above the top opening of outer casement 11. Lower cap part 25 can then be easily removed with tongs so that material may be introduced into o withdrawn from inner container 20 or the contents of inner container 20 merely observed. When appropriate, lower cap part 25 is then replaced on inner container 20 after which outer casement is lifted off of upper cap part 35. By placing upper cap part 35 back on top of lower cap part 25 and pressing downwardly, the assembly is repositioned for reapplication of casement cap 14. Then, if necessary, the entire vessel assembly 10 can be placed back in the microwave for further heating.

The design described above also facilitates empirical determination of appropriate time and power settings for the microwave digestion oven. It has been observed that the rupturable pressure disk 30 deforms upwardly into pressure vent 27 progressively as temperature and pressure within inner container 20 increase and before the disk actually ruptures. If the vessel assembly 10 is removed from the microwave digestion vessel and cooled prior to rupture, the extent of deformation of disk provides an indirect indication of the proximity of the pressure within inner container to the relief point of disk 30.

Parts molded of polyetherimide resin, such as the casement 11 and cap 14 have demonstrated excellent resistance to gamma radiation. Testing has revealed a loss of less than 6% tensile strength after cumulative exposure to 500 megarads at a rate of one megarad per hour using cobalt 60.

The high strength outer casement 11 eliminates the need for replacement due to mechanical failure. This reduces the cost per test down to approximately the cost of the replaceable disk 30 While eventual replacement of the inner container 20 may be required because of contamination of the inner walls after many uses, the replacement cost of a container 20 is minimal in comparison to replacement entire assemblies of the type currently being used.

A high temperature and high pressure microwave digestion vessel assembly is described above. Various details of the invention may be changed without departing from its scope. Furthermore, the foregoing description of the preferred embodiment of the invention and the best mode for practicing the invention are provided for the purpose of illustration only and not for the purpose of limitation--the invention being defined by the claims.

I claim:

1. A high temperature, high pressure chemical digestion vessel comprising:
   (a) a microwave transparent inner container having a bottom and integrally-formed cylindrical sidewalls the upper edge of which defines a cylindrical mouth for receiving material to be chemically digested under high pressure and high temperature;
   (b) a lower cap part having a pressure vent therethrough and an annular seat for being positioned on the cylindrical mouth of said container for receiving a replaceable, rupturable pressure release disk having a predetermined rupture pressure for being sealingly interposed in covering relation to said vent to seal the container and thereby enclose a substance to be digested in said container and to rupture and release pressure within said container if pressure within said container reaches said predetermined rupture pressure,
   (c) an upper cap part having a pressure vent therethrough and a bottom side with an annular seat matingly fitting onto the top side of said lower cap part without mechanical attachment and cooperating with the pressure vent of said lower cap part for containing a pressure release disk therein; and
   (d) a microwave transparent outer casement comprising a bottom and integrally-formed cylindrical sidewalls, an upper edge of which defines a cylindrical mouth, and a casement cap for attachment to the upper edge of said cylindrical sidewalls, said outer casement being of a diameter whereby said container is receivable therein in sliding surface-to surface contact, said casement caps and said outer casement each having connecting me wherein said casement cap is releasably attachable to said outer casement, said casement cap and said outer casement each being of a height whereby said upper and lower cap parts, said inner container, said outer casement, and said casement cap cooperate such that when said casement cap is releasably attached to said outer casement, said upper and lower cap parts, said inner container and said outer casement are maintained in a pressure-resisting relationship with one another.

2. A chemical digestion assembly according to claim 1, wherein said outer casement is formed of polyetherimide resin and said container is formed of perfluoroalkoxy resin.

3. A chemical digestion assembly according to claim 1, wherein said outer casement includes a through opening in a bottom surface for receiving a finger therethrough to assist in removal of said container from said outer casement.

4. A chemical digestion assembly according to claim 1, wherein said upper cap part includes an upwardly-projecting pressure-relief head of reduced dimension having a pressure-relief opening therein, and wherein said outer casement cap includes an opening therein for receiving said pressure-relief head therethrough.

5. A chemical digestion assembly according to claim 1, wherein said connecting means include threads.

6. A high temperature, high pressure chemical digestion vessel comprising:
   (a) a microwave transparent inner container having a bottom and integrally-formed cylindrical sidewalls the upper edge of which defines a cylindrical mouth for receiving material to be chemically digested under high pressure and high temperature;
   (b) a lower cap part having a pressure vent therethrough and an annular seat formed on a bottom side thereof for being matingly seated without mechanical attachment on the cylindrical mouth of said container and having an annular recess in a top side thereof for receiving a replaceable, rupturable pressure release disk having a predetermined rupture pressure for being sealingly interposed in said recess is covering relation to said vent to seal the container and thereby enclose a substance to be digested in said container and to rupture and release pressure within said container if pressure within said container reaches said predetermined rupture pressure;
   (c) an upper cap part having a pressure vent therethrough and a bottom side with an annular seat matingly fitting onto the top side of said lower cap part without mechanical attachment and cooperating with the recess of said lower cap part for containing a pressure release disk therein; and
   (d) a microwave transparent outer casement comprising a bottom and integrally-formed cylindrical sidewalls, an upper edge of which defines a cylindrical mouth, and a casement cap for attachment to the upper edge of said cylindrical sidewalls, said outer casement being of a diameter whereby said container is receivable therein in sliding surface-to surface contact, said casement cap and said outer casement each having connecting means wherein said casement cap is releasably attachable to said outer casement, said casement cap and said outer casement each being of a height whereby said upper and lower cap parts, said inner container, said outer casement, and said casement cap cooperate such that when said casement cap is releasably attached to said outer casement, said upper and lower cap parts, said inner container and said outer casement are maintained in a pressure-resisting relationship with one another.

7. A chemical digestion assembly according to claim 6, wherein said outer casement is formed of polyetherimide resin and said container is formed of perfluoroalkoxy resin.

8. A chemical digestion assembly according to claim 6, wherein said outer casement includes a through opening in a bottom surface for receiving a finger therethrough to assist in removal of said container from said outer casement.

9. A chemical digestion assembly according to claim 6, wherein said upper cap part includes an upwardly-projecting pressure-relief head of reduced dimension having a pressure-relief opening therein, and wherein said outer casement cap includes an opening therein for receiving said pressure-relief head therethrough.

10. A chemical digestion assembly according to claim 9, wherein said connecting means include threads.

* * * * *